Feb. 18, 1964 R. A. ZURWELLE 3,121,772
MOUNTING OF ELECTRIC CABLES
Filed Jan. 16, 1962
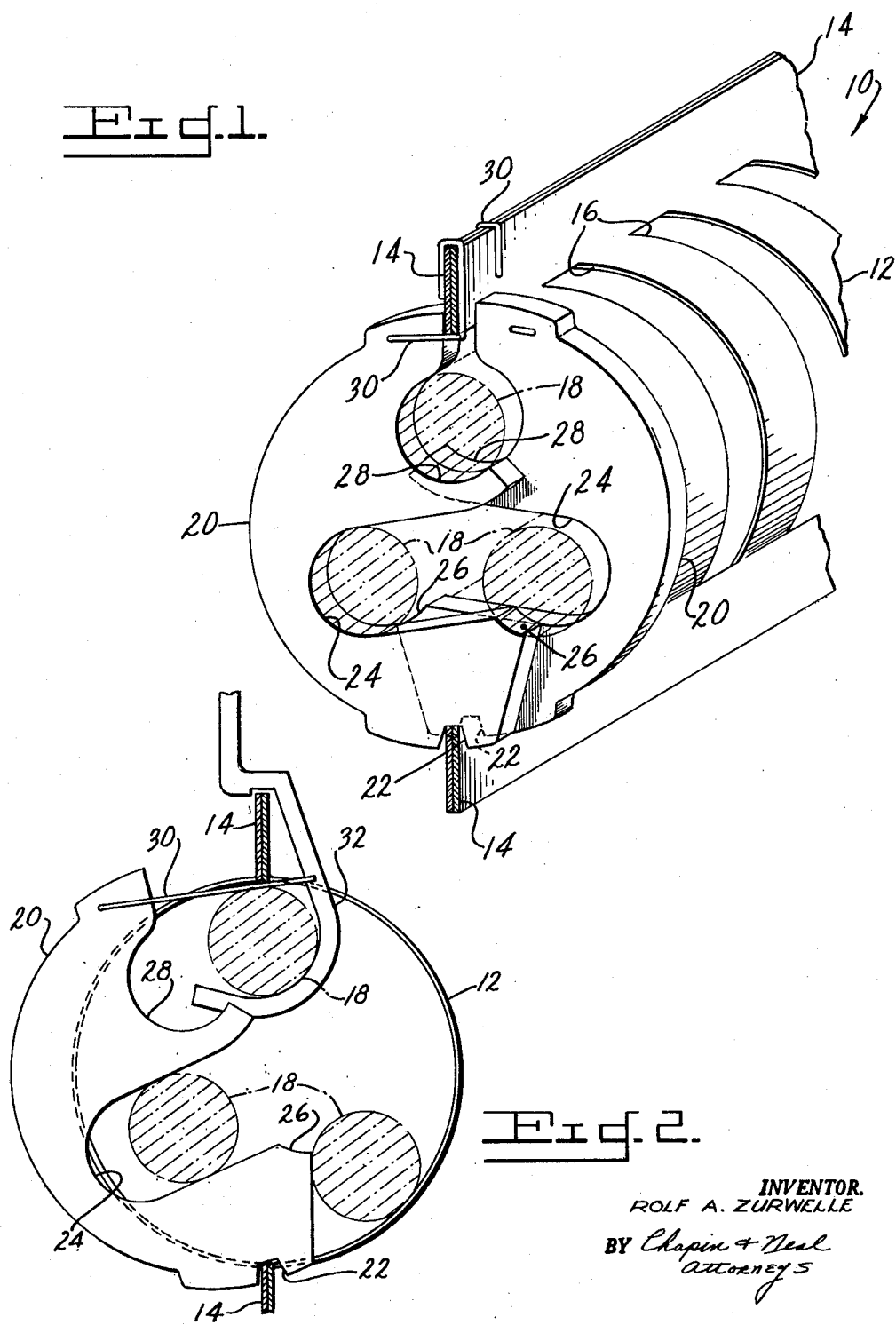
INVENTOR.
ROLF A. ZURWELLE
BY Chapin + Neal
Attorneys

United States Patent Office 3,121,772
Patented Feb. 18, 1964

3,121,772
MOUNTING OF ELECTRIC CABLES
Rolf A. Zurwelle, Port Washington, N.Y., assignor, by mesne assignments, to Atlas Corporation, Kings County, New York, a corporation of Delaware
Filed Jan. 16, 1962, Ser. No. 166,608
4 Claims. (Cl. 174—99)

The present invention relates to improvements in mounting means for flexible electric cables.

An object of the invention is to provide a mounting for electrical cables which will permit their use at what is referred to as "free air" rating in a wide variety of locations and operating conditions.

Prior practices in mounting electrical cables of any substantial length have usually involved the use of rigid or flexible metal conduits which totally ensheath the electrical cables.

Where electrical cables are so ensheathed to a point that they are considered totally enclosed, it is necessary to de-rate the current capacity of the cable by as much as 50%, according to the usual safety codes. Thus, an electric cable, rated to safely carry 100 amperes when installed in "free air," could only carry 50 amperes when installed within a closed conduit. One of the primary reasons for decreasing the rating of the totally enclosed cable is that lack of ventilation prevents heat from being dissipated at a rate sufficient for the insulation to withstand the temperatures which would be generated if the "free air" rating of current were carried by the cable.

The objects of the present invention are realized by utilizing an elongated, openwork casing in which longitudinally spaced separators mount a plurality of electric cables in spaced relation to each other and also in spaced relation to the casing. Preferably the spacers take the form of disks which are separately introduced through opposite sides of the casing to so support the plurality of cables after they have been pulled through the casing.

The above and other related objects and features of the invention will be apparent from a reading of the following description of the disclosure found in the accompanying drawing and the novelty thereof pointed out in the appended claims.

In the drawing:

FIG. 1 is a perspective view, portions of which are in section, illustrating a preferred embodiment of the invention; and FIG. 2 is a cross section illustrating the manner in which electrical cables may be mounted in the fashion shown in FIG. 1.

The present invention is based on the use of an openwork protective conduit 10 or sheathing as, for example, disclosed in U.S. Patents Nos. 2,748,803 and 2,748,804.

The conduit 10 may comprise two semi-cylindrical shells 12 preferably formed of steel and having flanges 14 which are spot-welded or otherwise joined to form the conduit 10. Slots 16 are formed in the shells 12 to give the conduit 10 its openwork character and also to give some degree of flexibility to the conduit in a plane normal to the flanges 14.

Electric cables 18 may be threaded through the conduit 10 either before or after it is mounted in the location where the electric cables are required. When installed, the cables 18 are spaced from each other and also spaced from the conduit 10 by separators 20.

The separators 20 are identical in configuration so that a description of one is equally applicable to the other. Each separator is preferably, but not necessarily formed of an insulating material having suitable strength as, for example, phenolic resin or hard rubber. A notch 22 at the bottom of each separator receives the lower flanges 14. A slot 24 opens inwardly of the conduit 10 and receives one of the cables 18. A surface 26, at the outer end of slot 24, projects into the outline of the slot 24 of the other separator 20 to lock the cable 18 in the end of the slot 24. Thus, the lower cables 18, in slots 24, are positively locked in the desired spaced relationships. The third cable 18 is positioned by seats 28 on the separators 20 which cooperate to positively lock the third cable in the desired spaced relation to the other cables 18 and in spaced relation to the conduit 10.

A wire 30 is secured to each separator 20 and holds the upper ends thereof in place by being wrapped around the upper flanges 14. The lower ends of the separators are positioned by the notches 22 while intermediate portions project through the slots 16 and engage the shell portions of conduit 10. The separators are thus positioned relative to the conduit 10. Successive separators are spaced apart along the length of the conduit, preferably in contiguous pairs as illustrated, so that the described spaced relationships of cables 18 are maintained throughout the length of said conduit.

Installation of the separators 20 is illustrated in FIG. 2. One separator is inserted through one of the slots 16 catching one of the cables 18 in the slot 24, as the notch 22 receives flanges 14 to serve as a fulcrum as the separator is tipped to an upright position. As this is done, another of the cables 18 is held in an elevated position by a hook 32 so that the cable may be readily positioned in seat 28. Thereafter the other separator may easily be brought to the position illustrated in FIG. 1 and the wires 30 wrapped around the flanges 14.

The openwork nature of the conduit 10 and the spaced relationship of cables 18, permits each cable to carry its "free air" rated current under most circumstances.

This conduit 10 with the spaced cables 18 therein may be readily mounted as a unit to support the cables in any desired location. The flanges 14 are of particular advantage where it is desired to span a substantial distance with the cables 18.

Having thus disclosed the invention, what is claimed as novel and desired to be secured by Letters Patent of the United States is:

1. A cable separator device for a tubular conduit adapted to enclose a plurality of electric cables, the conduit having opposing wall sections each of which is provided with a series of slotted portions directed cross-wise of the conduit axis, and opposing longitudinally extending connector portions between said wall sections, said device comprising a pair of disks, each disk having a notch in the outer edge thereof adjacent one end of the disk for seating on one of the connector portions between oppositely positioned slots of said wall sections and the other end of the disk having an end face swingable into abutting relation against an edge of the other connector portion for a mounted position of the disk, and means on the disk engageable with the conduit to hold the disk in said abutting relation, the inner edges of the disks being provided with recessed slots forming seats at their inner ends for receiving cables therein, the walls of the slots of one disk having portions for retaining a cable in the inner cable receiving seat of a slot of the other disk when a pair of disks are oppositely faced in adjacent mounted position.

2. A cable separating device for an electric cable conduit tube having diametrically opposed flanges extending outwardly from the tube and opposing wall sections between the flanges provided with closely spaced circumferentially directed slotted portions, said device comprising a pair of generally semi-cylindrical disks, each having a notch in the outer edge thereof adjacent one end for seating the disk on the inner edge of a flange and having means at the other end to hold said latter end in a mounted position adjacent the other flange and the disk transversely of the conduit axis, the said disks having slots opening to the inner edges thereof and providing recessed seats for receiving cables therein, and cable retaining portions adjacent each slot for extending into the path of a longitudinally projected outline of the slot of the other disk when a pair of said disks are oppositely faced in mounted positions.

3. A combination comprising an openwork protective conduit through which three electric cables extend, said conduit comprising a tubular portion which, for purposes of reference, is horizontally disposed with opposed vertical flanges projecting radially outwardly therefrom, said tubular portion having vertical slots formed in opposite sides thereof and extending from one flange to the other, a pair of insulating disk-like separators insertable through slots on opposite sides of said conduit, said separators each having a notch receiving the lower of said flanges and portions projecting outwardly of said tubular portion and further having means securing the upper ends thereof to the upper of said flanges to position the separators relative to the conduit, said separators being contiguously disposed and each having an inwardly open slot for receiving one of said electric cables and spacing it from the cable in the other slot and spacing both cables from the conduit, said separators each having a portion projecting into the horizontal outline of the named slot in the other separator and preventing displacement of said cables toward each other, said separators having cooperating recesses for receiving the third of said cables and positioning the same in spaced relationship from the conduit and from the other two cables.

4. A flexible conduit tube for electric cables having diametrically opposed flanges extending in the same plane, opposing wall sections between said flanges provided with a series of closely spaced slotted portions extending transversely of the axis of said conduit tube, and the said slotted portions of one wall section being in oppositely disposed relation to the said portions of the other wall section, in combination a plurality of cable separating devices for positioning electric cables in spaced relation to each other and to the walls of said conduit, said separating devices being spaced longitudinally of the conduit and each device comprising a pair of generally semicylindrical disks removably mounted in oppositely located slots of said wall sections, said disks having outer arcuate edges with a notch at one end thereof receiving the inner edge of one of said conduit flanges and at the other end engaging the side of the other of said flanges with a holding wire attached to the disk and wrapped around the said other flange, the inner edge of each disk having a pair of slots providing seats for said electric cables, one of said slots forming a seat at the edge of the disk and having a projecting edge portion overlapping the projecting edge portion of the other disk to encircle a cable therebetween, the other of said slots of the disks extending inwardly of the said inner edges thereof and forming seats at the inner ends of the slots at opposite sides of the plane of said conduit flanges, a portion of the disks forming the entrances to said latter slots having overlapping projecting edges, said projecting edges terminating in abutment portions within the outline of each said slot whereby electric cables are removably held on the seats of said slots.

References Cited in the file of this patent

UNITED STATES PATENTS

| | | |
|---|---|---|
| 289,164 | Strohm | Nov. 27, 1883 |
| 2,870,240 | Stieglitz | Jan. 20, 1959 |
| 3,005,609 | Joffe | Oct. 24, 1961 |

FOREIGN PATENTS

| | | |
|---|---|---|
| 480,198 | Canada | Jan. 15, 1952 |
| 932,914 | Germany | Sept. 12, 1955 |